United States Patent [19]
Bakker et al.

[11] Patent Number: 5,272,331
[45] Date of Patent: Dec. 21, 1993

[54] DOCUMENT IMAGING CAMERA WITH LAMP BENT INTO SYMMETRICAL LAMP SEGMENTS

[75] Inventors: Johan P. Bakker, West Bloomfield; Clive E. Catchpole, Birmingham; David B. Tratar, Dearborn; John D. Vala, Plymouth, all of

[73] Assignee: Unisys Corporation, Blue Bell, Pa.

[21] Appl. No.: 873,956

[22] Filed: Apr. 27, 1992

[51] Int. Cl.$^5$ .................. G01N 9/04; H04N 1/21
[52] U.S. Cl. .................. 250/223 R; 250/208.1; 358/475; 362/260
[58] Field of Search .......... 250/208.1, 216, 223 R; 358/474, 475; 356/71; 362/260

[56] References Cited

U.S. PATENT DOCUMENTS

| | | | |
|---|---|---|---|
| 3,198,982 | 8/1965 | Benson et al. | 358/475 |
| 4,723,072 | 2/1988 | Naruse | 356/71 |
| 4,821,332 | 4/1989 | Durham | 356/71 |
| 5,142,138 | 8/1992 | Yonezawa et al. | 250/208.1 |
| 5,144,457 | 9/1992 | Copenhaver et al. | 358/474 |

FOREIGN PATENT DOCUMENTS

| | | | |
|---|---|---|---|
| 0027670 | 2/1984 | Japan | 358/474 |
| 0182857 | 9/1985 | Japan | 358/474 |

OTHER PUBLICATIONS

Lama, "Diffuse Cavity Illuminators For Non-Platen or DVT RIS Systems" *Xerox Disc. J.* vol. 7, No. 5 Sep. 1982; pp. 339–34.

*Primary Examiner*—David C. Nelms
*Assistant Examiner*—Michael Messinger
*Attorney, Agent, or Firm*—John J. McCormack; Mark T. Starr

[57] ABSTRACT

Document-imager for imaging documents (e.g. checks that are transported past an imaging-site, where the site is illuminated by one (or two) pairs of lamps symmetrically disposed about the site, with image-reflection sent back between lamps to be captured.

21 Claims, 10 Drawing Sheets

DOCUMENT IMAGING CAMERA WITH LAMP BENT INTO SYMMETRICAL LAMP SEGMENTS

FIELD OF INVENTION

This invention relates to imaging of documents transported past an imaging station, and more particularly to illumination arrangements therefor.

BACKGROUND, FEATURES

Check processing systems are well )mown in the art. These require intense illumination means as workers know, especially with "electronic-imaging" where images of the two sides of a check are taken, stores and retrieved—as opposed to physically handling checks to process them. Many difficulties and disadvantages of prebent systems relate to how well the checks are illuminated. If the documents are not properly illuminated and imaged, the result is apt to be errors in reconciling and balancing check transactions and in reporting to customers (e.g. monthly statement).

Workers recognize that electronically-stored data ("electronic images") of documents can be processed much quicker, more reliably and less subject to error (than the documents themselves). But to do this, one must first capture an accurate image and convert it into electronic computer (EDP) signals. The EDP image-signals can then be manipulated (e.g. be recorded, be reproduced for visual review, be sorted and distributed, etc.) much more rapidly, easily and more reliably than physical documents.

Systems for "electronic imagelift" will conventionally contemplate using a video camera by which an operator views the actual document as desired. Based on what he sees, the operator can then electronically enter document-data into a computer system; e.g., such things as check-amount, account number and other data necessary for processing document transactions. Such physical viewing is labor-intensive, is subject to error (e.g. from operator fatigue) and is substantially slower than an automated image-capture, -manipulation arrangement.

Workers are beginning to think of using imaging technology as a way of improving document processing, as disclosed, for example, in U.S. Pat. Nos. 4,510,619; 4,205,780; 4,264,808; 4,672,186 and 5,098,713. Generally, imaging involves optically scanning documents to produce electronic images that are processed electronically and stored on high capacity storage media (such as magnetic disc drives and/or optical memory) for later retrieval and display. It is apparent that document imaging can provide an opportunity to reduce document handling since the electronic images can be used in place of the actual documents.

It would be somewhat conventional to contemplate document processing and associated "image capture" using conventional video cameras, with conventional light sources, one to illuminate each side of a document, plus various lenses to focus light onto the document. Successive document-images ("image slices") can be reflected from the document, front and rear, into respective video cameras, which can convert the optical image into electronic signals; which can then be converted by appropriate circuitry into digital form. But the foregoing would have serious disadvantages; e.g. it would require conventional light sources and conventional camera systems—something expensive to provide and cumbersome to coordinate.

U.S. Pat. No. 5,098,713 addresses such disadvantages; e.g. teaching use of a single, high-intensity, well-cooled light source (cf. high-output xenon bulb, requiring substantially less power than a conventional two-lamp system); and mounting the light source and associated optical components on a base (e.g. for ready access, for maintenance and for better thermal isolation).

The present invention modifies the illumination portion of such arrangements for "modest systems", i.e. relatively smaller, slower, simpler, less expensive systems; e.g. for use in a table-top, low speed, proof-type machine, such as for front-office and teller-station applications. Such a machine can typically be used for immediate encoding and endorsing of checks and other similar financial instruments, one at a time, on demand and in small volumes. For such applications, low cost and small size are important. Our preferred modest, camera for this is adapted to image documents at a relatively modest flow rate, e.g. 30 documents per minute, at a document speed of the order of 15 inches per second.

Such a machine can form a pivotal part of a "return item processing" system, intended to allow the semi-automated processing of documents which are unreadable by conventional high speed automated equipment (e.g. at 1800 documents per minute), or which are selected by the customer for manual processing for a variety of reasons. Such items may include (but are not limited to) documents which are unencoded when presented to the customer, damaged in transit, or selected for special processing due to their value. For these reasons, such a machine should have both Imaging and OCR (Optical Character Recognition) capabilities.

In view of the modest document-flow rate, relatively less document illumination is required for imaging. To our surprise, we have found that fluorescent lamps in an appropriate configuration, can provide sufficient light.

In a preferred embodiment, our machine is specified with one or two separate (but identical) cameras: a front camera, which is always present; and an optional rear camera which may be replaced by a blanking plate. In this way, a customer who desires to image only the front of the document may be accommodated at lower cost.

Details

One important objective in designing a camera for such imaging is to provide illumination of highly uniform and constant intensity, both from top-to-bottom (and side-to-side, of beam) of the document and also across track-depth (i.e. of the track within which the document is constrained and driven). Highly-desirable are low-cost, simple and readily-obtained parts; thus, fluorescent lamps might be a desirable source of illumination if their intensity/uniformity were adequate. But this would likely be viewed by artisans as highly unlikely.

Initial Concept

FIG. 3A represents (plan view) the kind of camera we first contemplated, with documents advanced along a track DT past an illumination aperture SL, with lamps $L_1$, $L_2$ illuminating the respective Front/Rear imaging-sites (IS, IS'; offset from one another); the document images to be sent to sensor means along some imaging path OP. (FIG. 3B represents a modification of the FIG. 3A arrangement and is detailed below.)

Our first thought was to see if relatively conventional fluorescent lamps were adequate for illuminating such an imaging station (e.g. in camera like FIG. 3). FIGS. 6A, 6B represent this, where we used a pair of such lamps to symmetrically bracket the imaging site and send the reflected document-image back between the lamps. Lamps T'$_1$, T'$_2$ will be understood as a pair of relatively conventional fluorescent tube lamps disposed to symmetrically bracket intermediate imaging-path 1P (in phantom, FIG. 6A), with a shield serving to define an illumination-slit SSL (like SL in FIG. 3). To avoid the "dark-ends" of each tube [reduced intensity, nonuniformity] we tried masking-off the two "dark-ends" of each tube T'$_1$, T'$_2$ from the passing documents with slit SSL(see document Doc in FIG. 6A, the leading end of a check thrust along track DT on base plate BP; thus the height of slit SSL is set to correspond with maximum expected document-height.

Workers will recognize how convenient it is to so illuminate a document-site symmetrically from both sides and send the document image back between the lamps (to be captured by CCPD or like camera means). In fact, we were surprised that such an arrangement could give adequate illumination.

However, such an array of lamps seemed excessively "tall", so we conceived bending both lamp ends to reduce their height (e.g. see FIG. 6C, a modification of FIG. 6B, where the tubes are so bent; only T"$_2$ shown). Of course, such a right-angle bending keeps the dark-ends, obscured so they don't affect document-illumination; however, one countervailing disadvantage is that machine width may be increased (i.e. in direction of bent ends). But this latter disadvantage may be ameliorated by a reentrant, or 180°, bending of tube ends as in FIGS. 4A, 4B—especially where the tube tubes are replaced by a single over-long tube which is bent 180° to yield the two illuminating segments (as in FIGS. 1-4; detailed elsewhere).

Problems with Fluorescent Lamps

A common problem with illumination from fluorescent lamps is the "dark zone" of reduced intensity at either end of the lamp tube (in the region of the cathodes and/or the filaments by which the tubes are emergized). This "dark zone", is an unavoidable by-product of lamp operation and typically extends about 1" to 2" along either end of the tube, where intensity is much lower than that for the rest of the tube (i.e. along its intermediate "medial" segment).

But, we have found, to our surprise, that this "medial" segment, for a miniature-type fluorescent lamp (e.g. approximately 7 mm in diameter) could be adequate in intensity, wavelength spectrum and uniformity for the "modest" imaging applications previously described. It was quite surprising that a mere fluorescent lamp could be made adequate.

To further avoid the problems of reduced intensity and poor uniformity associated with the "dark zones", we tried not only bending the tube ends reentrantly, but also placing both ends "behind" the central (uniform-light) tube segment, opposite the document site. In effect, this "hides" the "dark zones" from the document which thus "sees" only the medial segment (see FIG. 4A, referring to medial segment CS and "dark zones" DE)—while "competing" the array, minimizing it's height and depth.

At first, this seemed impractical as possibly restricting the fluorescent discharge and degrading lamp illumination. But we found that if a fluorescent tube is so bent such that the bend-radius doesn't exceed tube-radius, the tube will operate satisfactorily; i.e. under such conditions, it's discharge will follow the elongate tube-axis as effectively as if the tube were straight (unbent). if the bend is more severe, illumination (discharge) is compromised.

A more conventional approach might be to only mask-off, the "dark zones", and leave the tube straight, as in FIGS. 6A, 6B above described. But this is impractical here, for the tubes we contemplate, of the tube-length taken up by the "dark zones" would make the camera (housing) undesirably "tall". And bending the ends 90°, and shielding them (e.g. as in FIG. 6C, described above) undesirably extends machine depth and height.

Another approach might be to partially opacify (filter) the central tube segment so that its intensity more closely matched that of the ends. But this seemed impractical because it extends machine height (as above) and because the intensity of the ends is, itself, not uniform; also it varies with age and other factors; further the length of a "dark zone" tends to increase unpredictably as the tube ages (typically after several thousand hours of operation).

An object hereof is to address at least some of the foregoing problems and to provide at least some of the mentioned, and other, advantages.

BRIEF DESCRIPTION OF THE DRAWINGS

These and other features and advantages of the present invention will be appreciated by workers and they become better understood by reference to the following detailed description of the present preferred embodiments which should be considered in conjunction with the accompanying drawings, wherein like reference symbols denote like elements:

FIG. 3B is a plan, sectional view of a Front-Camera half of this embodiment, with the (identical) Rear-Camera half suggested in phantom (and offset); while

FIGS. 6A, 6B show the lamps of the FIG. 3A embodiment, while

DESCRIPTION OF PREFERRED EMBODIMENT

Exemplary Use

Before giving more details of the subject image-lift embodiment, we note the document handling arrangement shown in U.S. Pat. No. 5,098,713; whose relevant portions are herewith incorporated herein, as exemplifying use-environment in which such an embodiment can be employed.

The methods and means discussed herein, will generally be understood as constructed and operating as presently known in the art, except where otherwise specified; likewise all materials, methods, devices and apparatus described herein will be understood as implemented by known expedients according to present good practice.

Document images For "high-speed" are to be captured at the real-time transport speed of the document processor. For "high-speed" document processors, transport speed will be understood as at least 300 inches a second, or about 2000 documents/min.; while "modest" document processors, move documents at approximately 1000/min. (or less, as here contemplated at about 150 inches/second, track speed). Acquiring electronic representations of documents traveling non-stop at these speeds is a real challenge and requires specialized hardware and software.

Now we will briefly outline how a preferred image-lift embodiment works; and thereafter take-up various sub-units thereof in more detail.

Embodiment A, in General

In general it will be seen that our preferred "image-lift" arrangement is adapted to be incorporated into a moderate-speed document processor. "Image-lift" can be performed just upstream of a set of sort-pockets, (with a document transport means moving documents past the Front/Rear illumination/imaging stations).

Figure 3A:
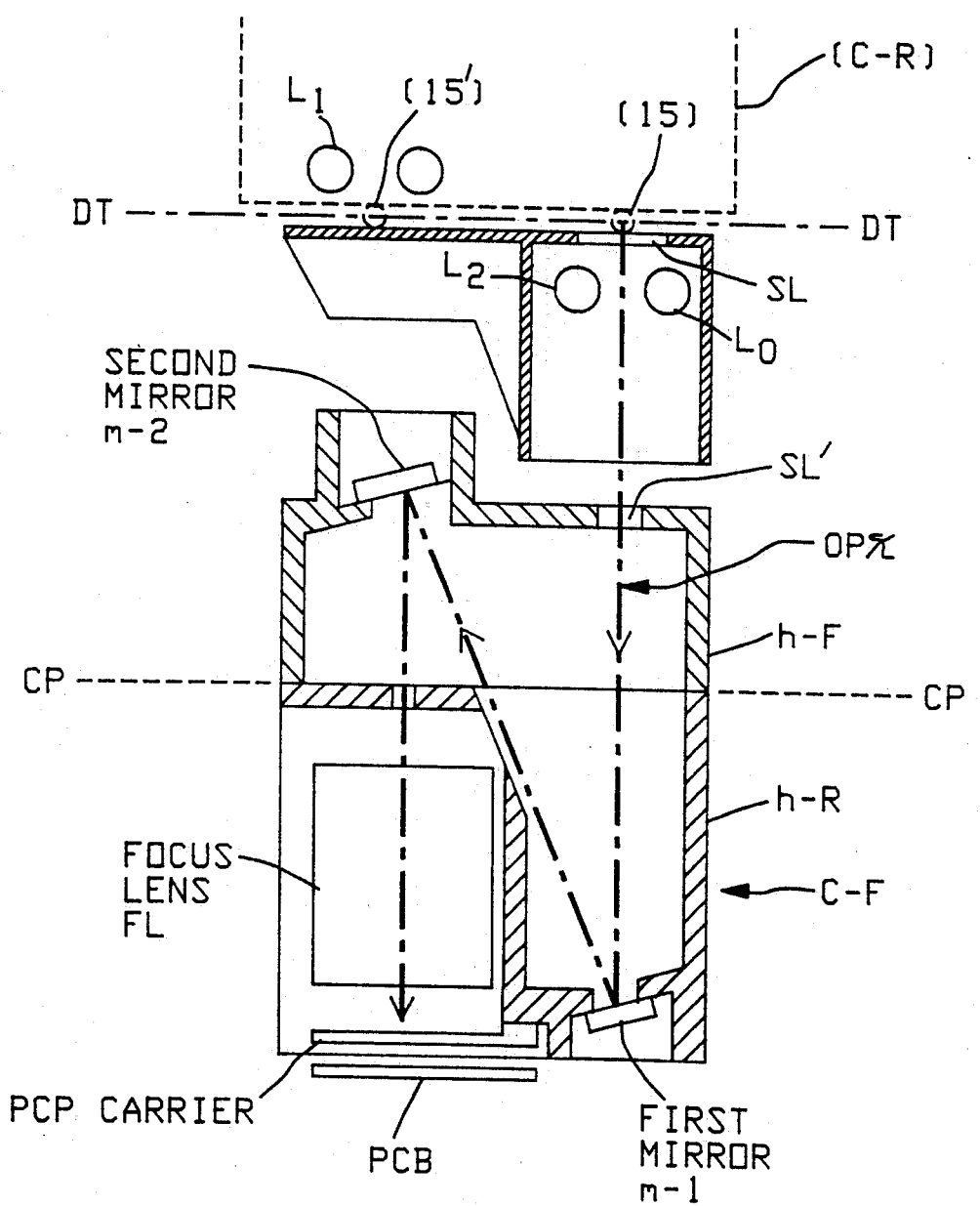
FIG. 3A is a like showing with a different lamp array; with FIGS. 3C, 3D showing the lamp-document area of FIG. 3B, enlarged.
Figure 3B:
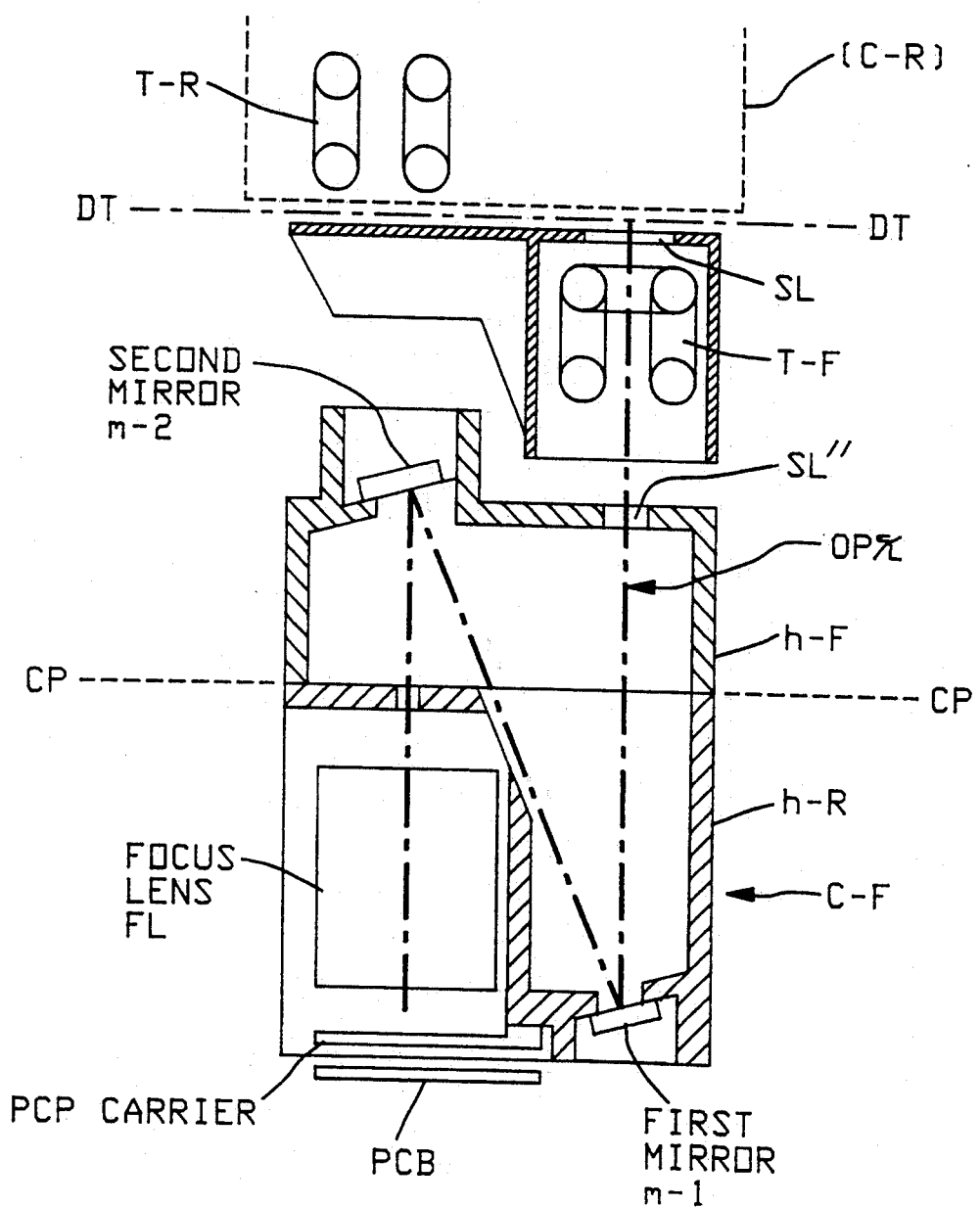
Figure 3C:
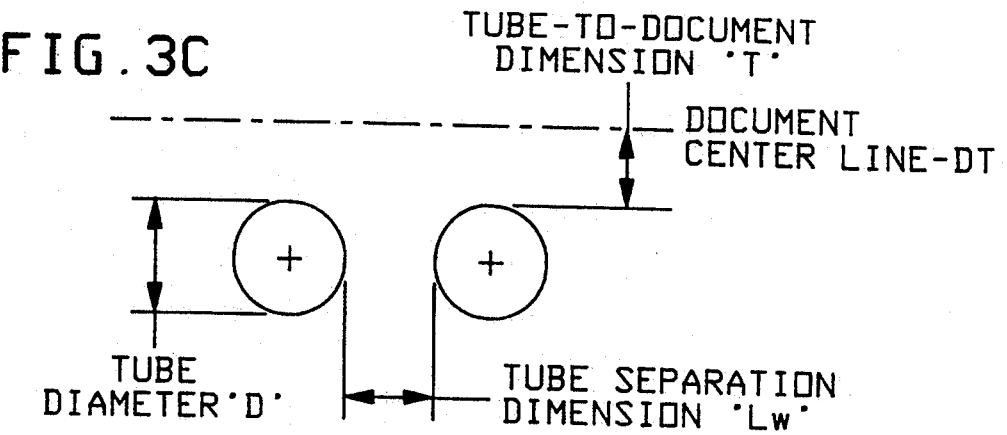

FIG. 3B shows, in idealized section, a plan view of a FRONT camera C-F embodiment, positioned on the front side of a document transport track DT. An identical REAR camera (C-R, in phantom) will be understood as, optionally, placed opposite C-F, but offset therefrom, to illuminate and image the rear side of passing documents. [This embodiment is like that of FIG. 3A described above, except that its lamps are modified.]

Camera C-F will be understood as comprising a "reentrantly-bent" fluorescent lamp T-F and a camera-detector array PCB, these being housed in housing h mounted on base plate BP. Lamp T-F is optically coupled to PCB via the target-document and associated optics (e.g. via first and second mirrors M-1, M-2 plus focusing lens means FL). The illuminating light from lamp T-F is directed onto a (front) side of the passing-documents; preferably being directed via a transparent guide wall G-W which contains an image slit SL. Slit SL is provided and dimensioned (see height $s_h$, width $s_w$, FIG. 4B) to mask-out stray light; e.g. here understood as matching document-height (about 51 above track DT, FIG. 4B) and lamp-width.

Wall G-W is flush with the document-confronting face of it's housing, so it may guidingly contact a passing document, preventing any "snagging" thereof, and is preferably filled with clear glass or like transparent filler g-f as a "Window" to allow the image of the passing document to be captured without interference from dust and like debris which may collect on the faces of guide wall G-W. As seen in enlarged plan view FIG. 3D, filler g-f may be smoothly reduced in diameter to conduct reflected images along image-path 1P.

A second image slit SL' is provided to allow the image of the passing document to enter the camera housing h while restricting the entry of undesired stray light; slit SL' is also preferably filled with a window of clear glass or like transparent material to prevent the entry of dust into housing h (e.g. here SL' is preferably about 4" by ¼").

Figure 1:
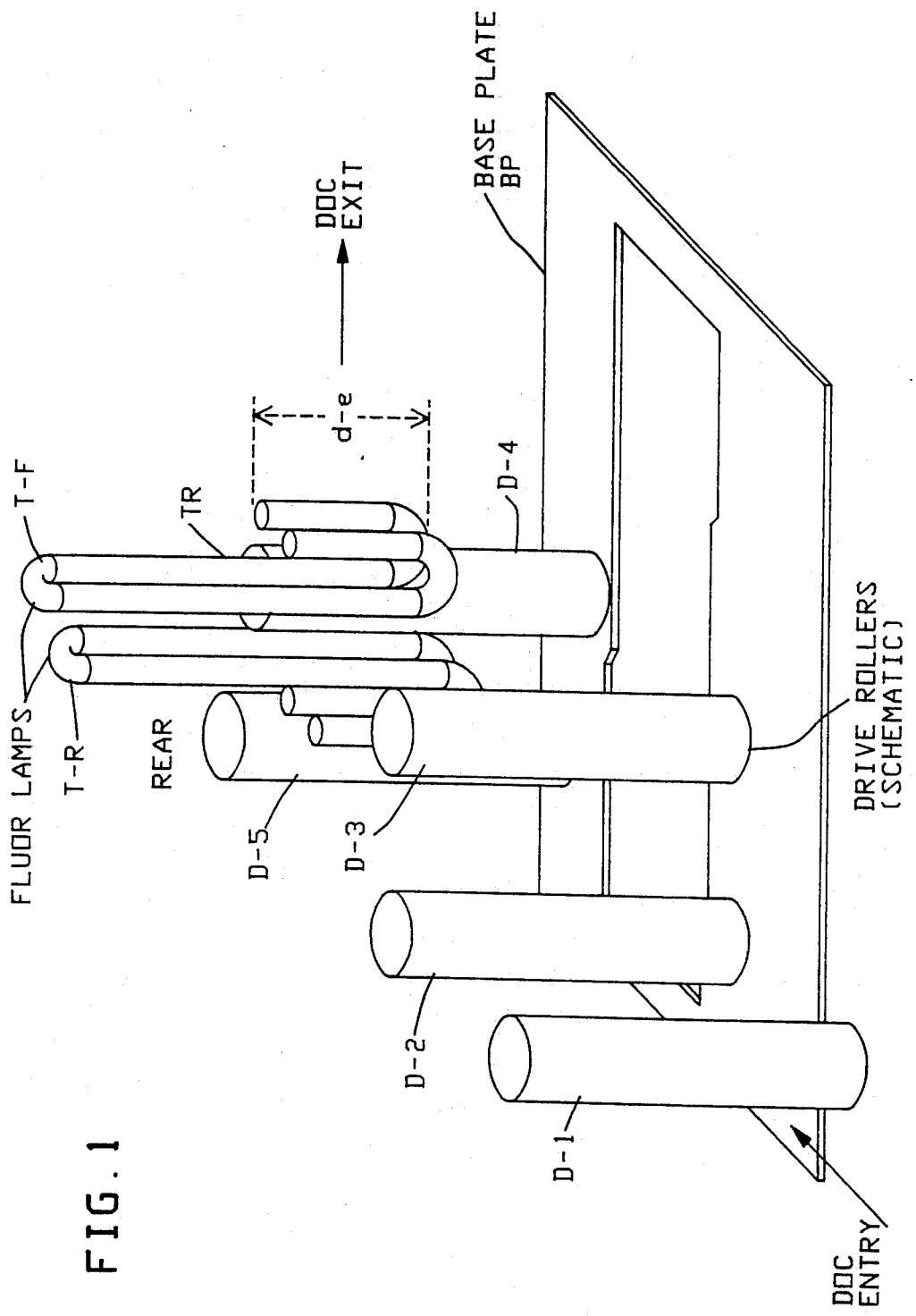
FIG. 1 is a perspective, idealized showing of the illumination-site portion of a preferred embodiment.

As mentioned, a REAR camera C-R, identical to C-F, may be disposed (e.g. on common base plate BP) on the opposite (rear) side of track DT, but offset from CF, to allow imaging of the rear face of passing documents (e.g. see fluorescent lamp T-R thereof, in FIG. 1).

In such a case, the two cameras are preferably mounted on common baseplate BP (see FIG. 1) along with associated successive (serial) drive rollers D-1, D-2, D-3, D-4, D-5 (assume that each roller has a respective opposing idler roller; such are not shown here, but are well known in the art) to advance the documents in prescribed fashion past the illumination/imaging sites (apertures SL) of each camera, as known in the art.

The document transport-path (along track DT) is suggested in FIG. 1: between "document entry" and "document exit" sites. The incoming document is first engaged and diverted by rollers D-1, D-2 and D-3 to pass in front of the image slits (SL, SL' of the front and rear cameras) then it is engaged by rollers D-4 and D-5 to extract (exit) the document, urging it beyond the camera, as known in the art. Rollers D-1, D-2, D-3 are disposed so as to form a "buffer" track sufficiently long that a maximum-length document (typically 9.00") will have completely exited any upstream section of the machine and be completely contained within the imaging system module (camera). In this way, variations in document speed caused by other operations, (such as printing), will not affect scan-speed and so distort the image. The document is then engaged by rollers D-4 and D-5 to extract it from the imaging-site(s) and remove from the machine, as known in the art.

We prefer to operate such fluorescent lamps in "RMS current" mode (as opposed to "Ballast operation"); and to operate from an AC sinusoidal source, with frequency > 20 kHz to avoid "flicker" and any effects that may annoy the operator. We prefer to keep the frequency < 30 kHz, and to keep voltage and current as nearly sinusoidal as possible, thus minimizing undesired electromagnetic emissions and ensuring compliance with regulatory requirements.

Also, an optical sensor, typically silicon photodiode, is preferably positioned to monitor the light output from the lamp; whereby output from this sensor may be used to ensure constant camera sensitivity, and obviate any need to calibrate the sensitivity of the system.

Each camera housing h is preferably composed of a front portion h-F (see FIGS. 3, 5) and a rear portion h-R. Front portion h-F contains image mirror M-2 and associated retaining features (e.g. window h-s) and image slit SL'. Rear portion h-R (FIGS. 2, 3) is coupled to front portion h-F along coupling plane CP-CP as known in the art.

The rear portion h-R (FIG. 2) houses the first mirror m1, focusing lens means FL and the detector assembly. Lens FL is preferably mounted in a V-block (VB) and secured by a retaining clamp RC (not shown, but known in the art) which permits minor position adjustment, (here, typically ±0.160") to optimize image focus, as known in the art. Detector assembly PCB consists of a printed circuit board on which is mounted the camera electronics (charge-coupled photodetector CCPD, and associated circuitry as known in the art).

Figure 2:
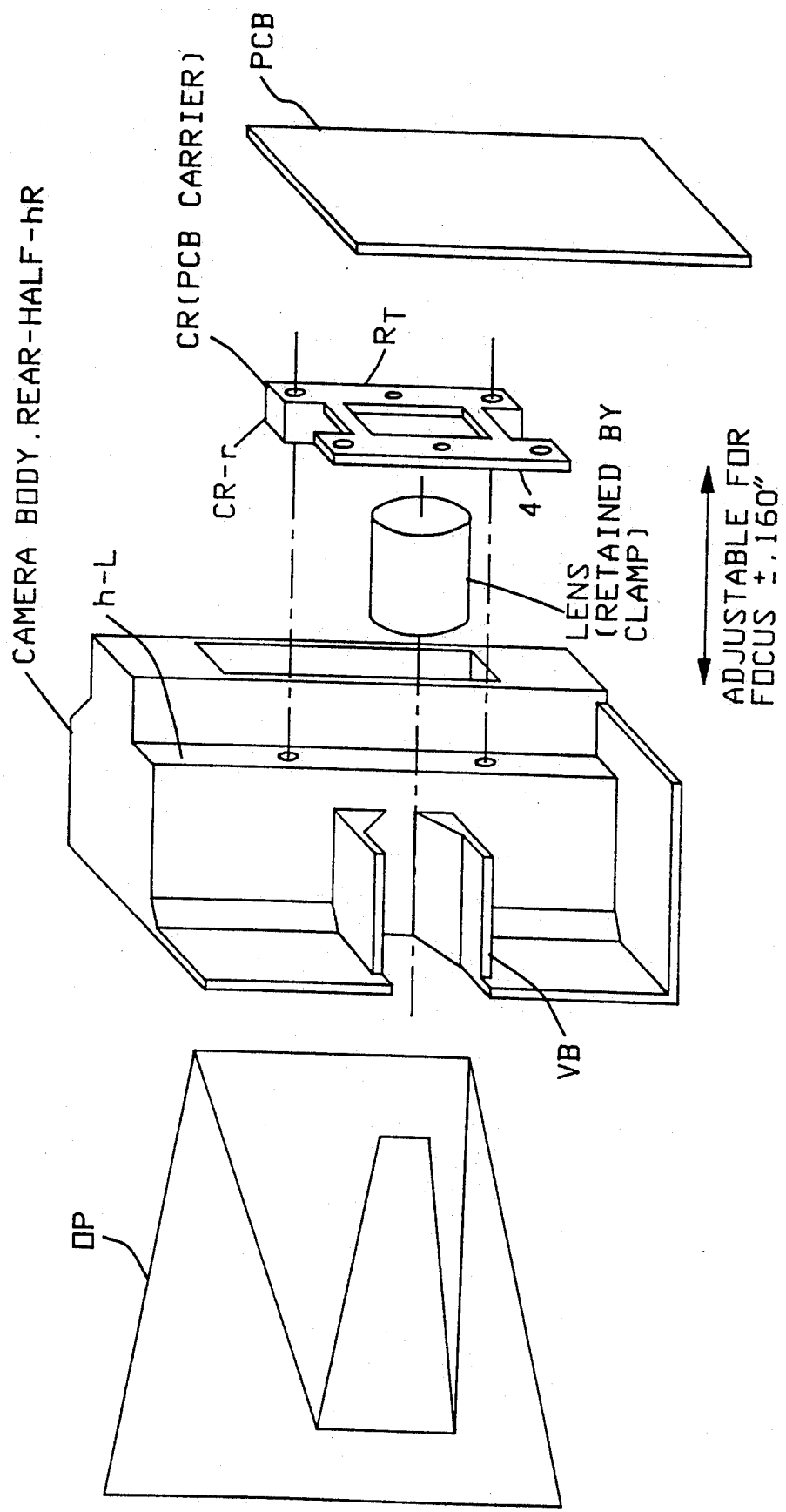
FIG. 2 is a schematic, idealized showing of the "imaging" portion of this embodiment#, with parts exploded-apart for clarity.

Assembly PCB is preferably mounted to rear housing h-R via a holder or carrier CR, which is preferably designed to be mounted in "reversible" fashion; i.e. carrier CR has an extended rim CR-r along one edge therefor, and is to be screw-fastened by one or other edge onto a prescribed surface h-L of rear portion h-R. Thus, when PCB is screw-fastened to CR as illustrated in FIG. 2, the detector is thereby positioned a fixed distance d-0 from lens FL; however, if PCB is screw-fastened to CR where CR is rotated by 180 degrees from its previous position, [so that its "left side", becomes it "right side", and so that rim CR-r is, now, not mounted to surface h-L] then, the focal distance changes by the protruding length of rim CR-r (e.g. in the preferred embodiment, by 0.200"). This reversible mounting means is desired to allow the focal length to be altered to accommodate the wide range of variation in the focal length of commercially available lenses (typically +/−5%) while continuing to maintain our desired tolerance of magnification ratio of <2%.

Board PCB is also made adjustable up/down and left/right (e.g. in the preferred embodiment by +/−0.050" in each axis) to ensure that the field of view of the camera is centered upon the detector CCFPD and that any variations in the lens FL and associated parts may be negated.

Figure 5:
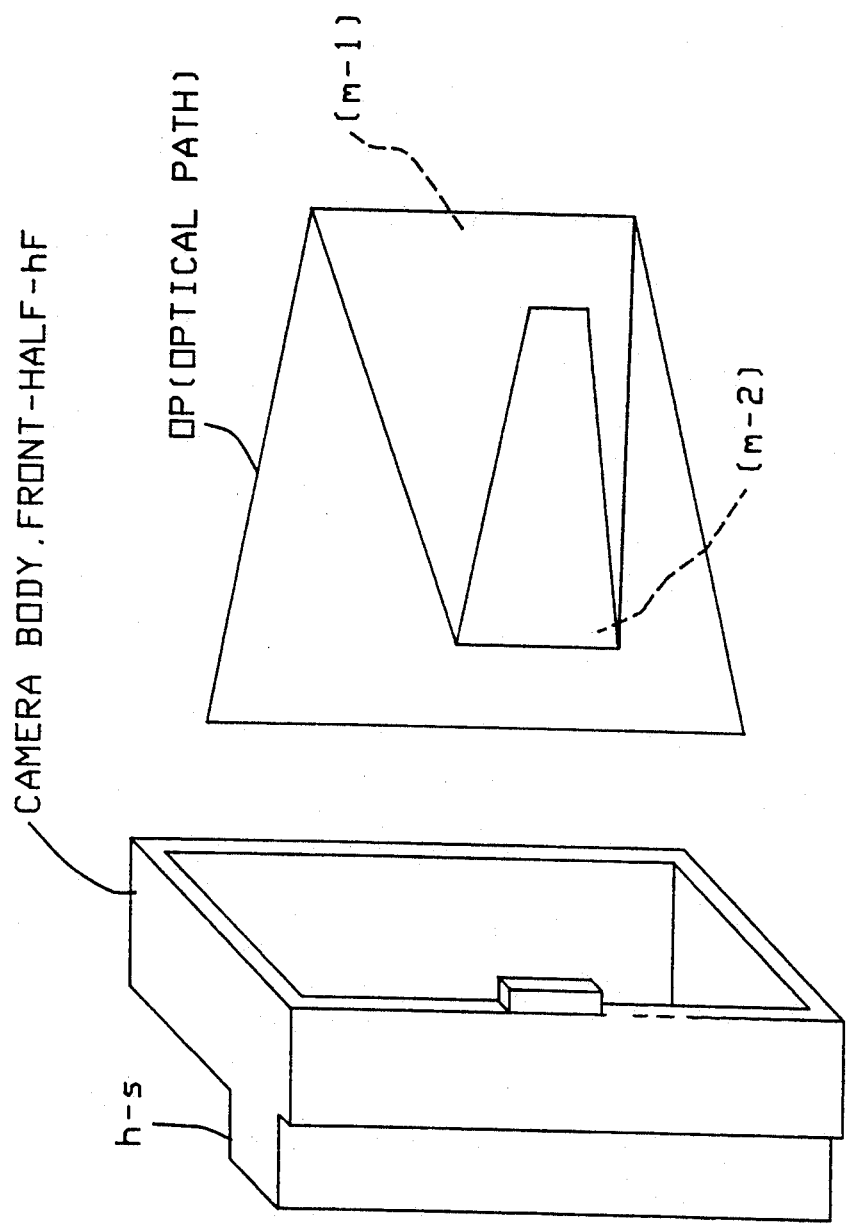
FIG. 5 is a very schematic perspective showing of the camera-housing portion of FIG. 2, with the image-path therein suggested and exploded away.

The configuration of the optical path is also depicted both schematically and notionally in FIG. 5. Note that the optical path is "folded upon itself", as it were, by its consecutive reflections from mirrors M-1, M-2, i.e. it is "doubly reentrant", principally to produce a smaller and more compact camera for the desired optical path length.

We have calculated the optimal geometry for the separation of the active parts of the fluorescent lamp tubes, and find that, to give the best, most uniform illumination in the volume occupied by a document through the depth of the track, there is a relationship between the diameter of the tube (e.g. here: 8 mm.), the spacing LW of the tube sections (preferably by tube diameter, or 8 mm, see LW, FIG. 4B) and the distance to the document which gives the best uniformity and intensity (preferably $0.64 \times LW \pm 10\%$). More particularly, please note FIG. 3C and observe that to obtain the maximum illumination on the document from two directions each side of the image site, it is desirable to reduce the tube separation "LW" to a minimum. However, dimension "LW" can be no less than equal to the tube diameter "d", or the tube will not function correctly. We have found illumination is achieved with a tube-to-document dimension "T" equal to approximately 0.64 LW plus or minus 10%.

For instance, placing the lamp(s) too close to the document in effect spreads the illumination (decrease intensity) e.g. for the indicated embodiment, not closer than about 0.125 inches, while displacing them too far away (e.g. more than 0.300 inches here) will degrade illumination intensity too much (cf. inverse square dependency).

According to a feature hereof, each fluorescent lamp is bent reentrantly (180°, e.g. see FIGS. 4A, 1) such that the "dark zones" at each end are substantially hidden from the passing document by the interposed medial illuminating segment of the tube. And, these "bends" may emit somewhat less intensity so they are preferably "hidden" by elevating the document track DT above them (e.g. see FIGS. 4A, 4B).

Figure 4A:
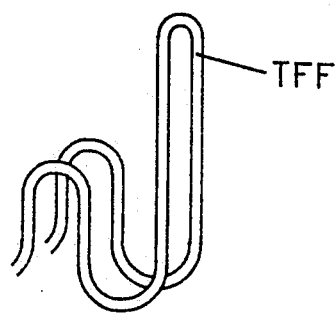
FIG. 4A, 4B are respective idealized perspective side and front views of one doubly-bent fluorescent tube of this embodiment; while FIG. 4AA shows further bending thereof.
Figure 4A:
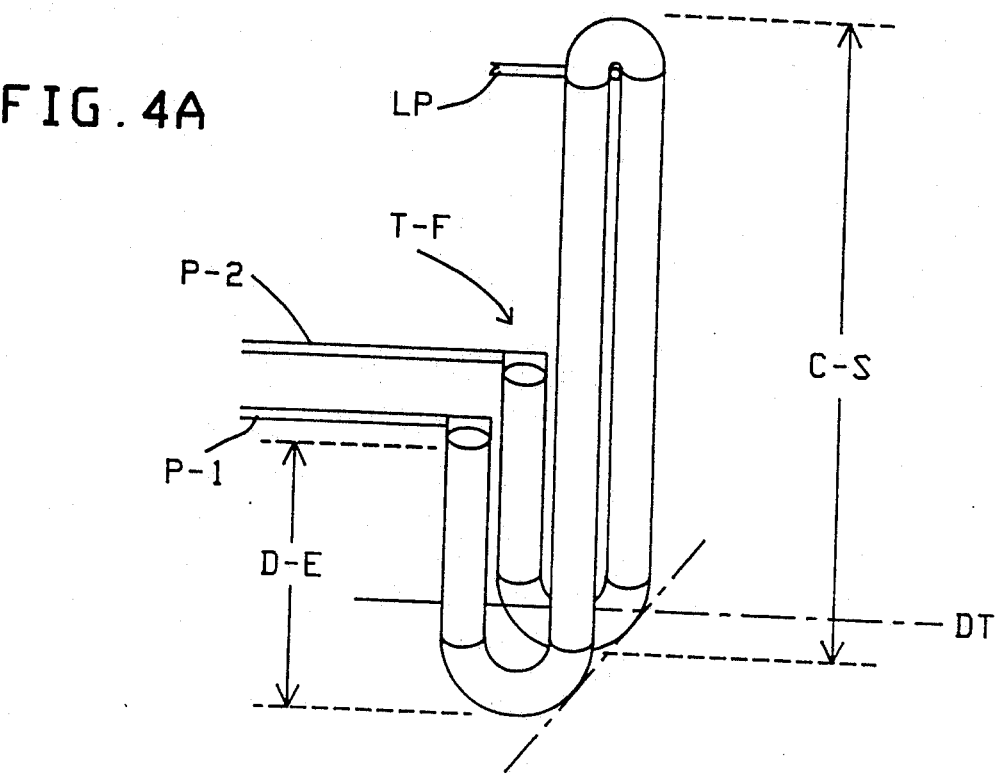
Figure 4B:
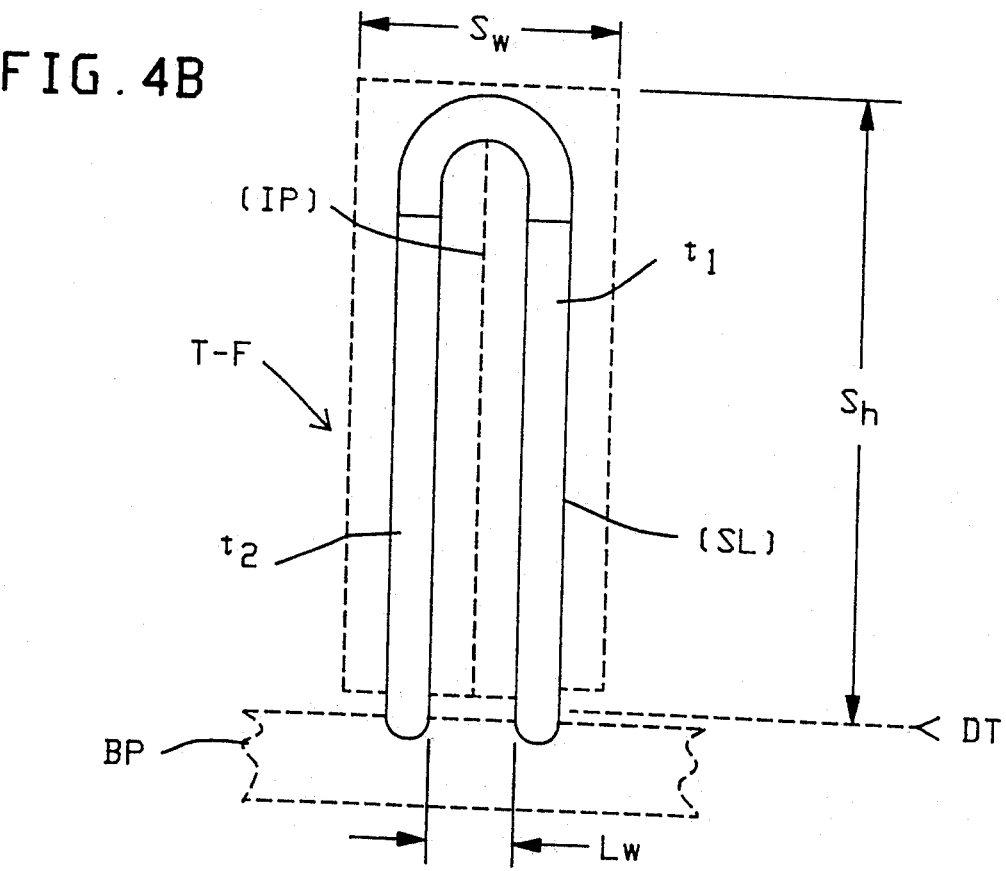

Further, to minimize the overall height of the camera, and to make the illuminating segment of the tube (as nearly as possible) equal in height to the "tallest" document to be illuminated, the illuminating segment is, itself, also preferably bent reentrantly, in the direction of beam-width,—thus yielding a "triply reentrant" tube configuration (e.g. in FIGS. 1, 4A, 4B; preferably, the overall length of the tubes here are approximately 17", extending 5-6" above the base of the document track, DT, see height c-s, FIG. 4A; each "dark zone" D-E being approximately 2" long; the maximum height of document to be illuminated here being 5"—this leaves about 5-5.5" for the height c-s of each medial illuminating segment, after subtracting the two lower-bend portions).

Figure 6A:
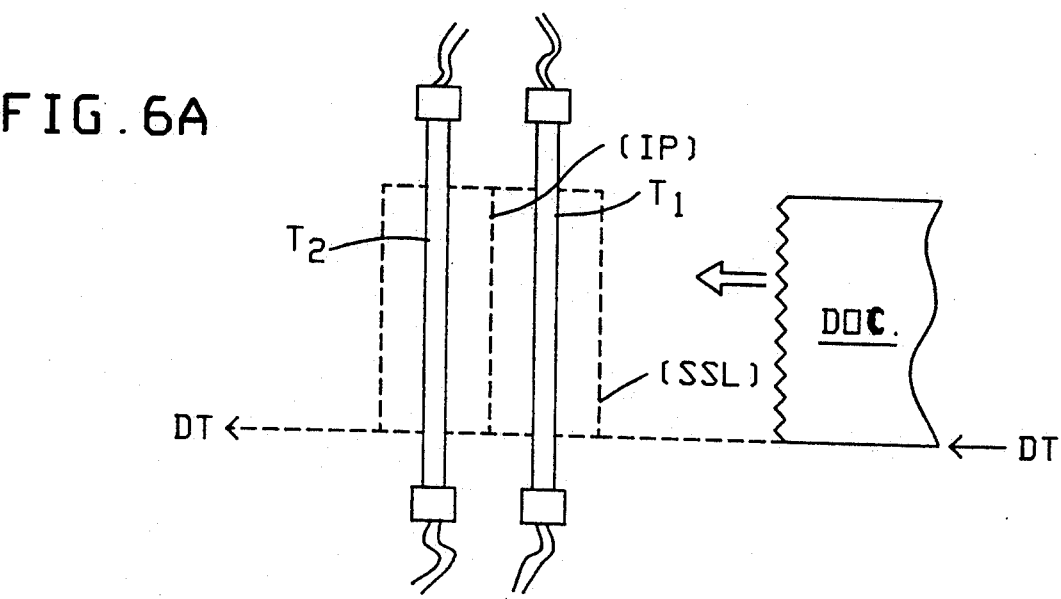
Figure 6B:
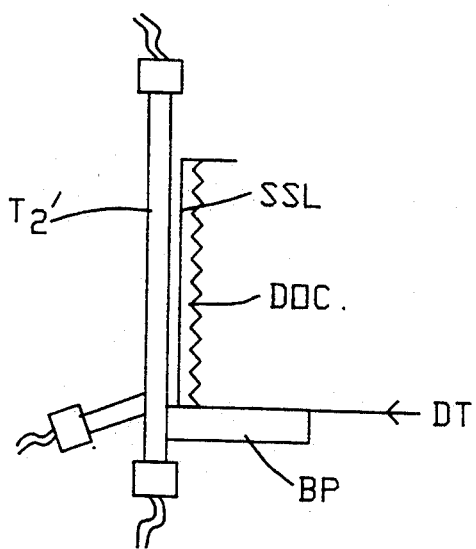
Figure 6C:
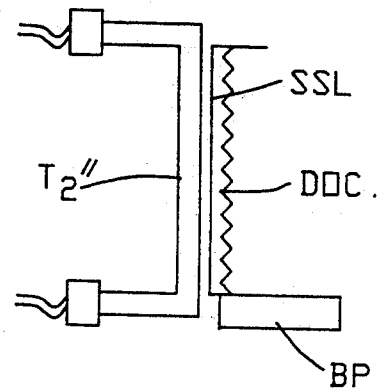
FIG. 6C shows one such as modified.

This beam-width bending yields a pair of parallel illuminating tube segments $t_1$, $t_2$ (see FIG. 4B) that symmetrically flank the image-path (1P, FIG. 4B). Workers will understand that it can be very useful to so illuminate the document-slice symmetrically, and uniformly from both sides—according to this feature—while also using a single bent tube e.g. vs. using two separate tubes as in FIGS. 3A, 6A above discussed.

In other instances, the dark-ends may be further bent, reentrantly, to hide them "behind themselves" to some extant [e.g. as in FIG. 4AA, where the ends are twice so-bent, thus hiding the darker end-most dark-portions behind portions closer to the medial segment.

The lamps may be mounted in any convenient manner as known in the art (e.g. on connector brackets like P-1, P-2 in FIG. 4A; these being made somewhat resilient and mounted and arranged as known in the art—not shown here; the resilience accommodating thermal expansion and minor variations in tube dimensions/location. A hook or locating pin LP may be provided to engage to top-bend of each lamp as indicated in FIG. 4A).

In any event, we find that, for such bends as the doubly- and triply-reentrant bends described, the internal radius of the bend should not be less than the radius of the tube, to ensure that the fluorescent discharge will not be affected (e.g. disrupted).

Figure 3D:
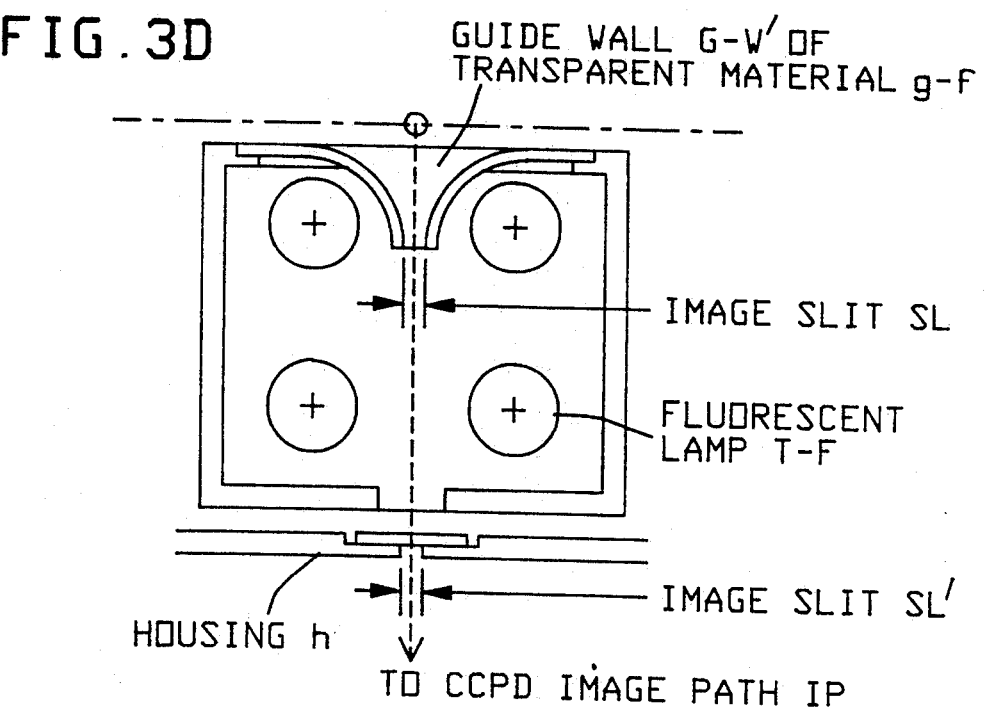
Figure 7A:
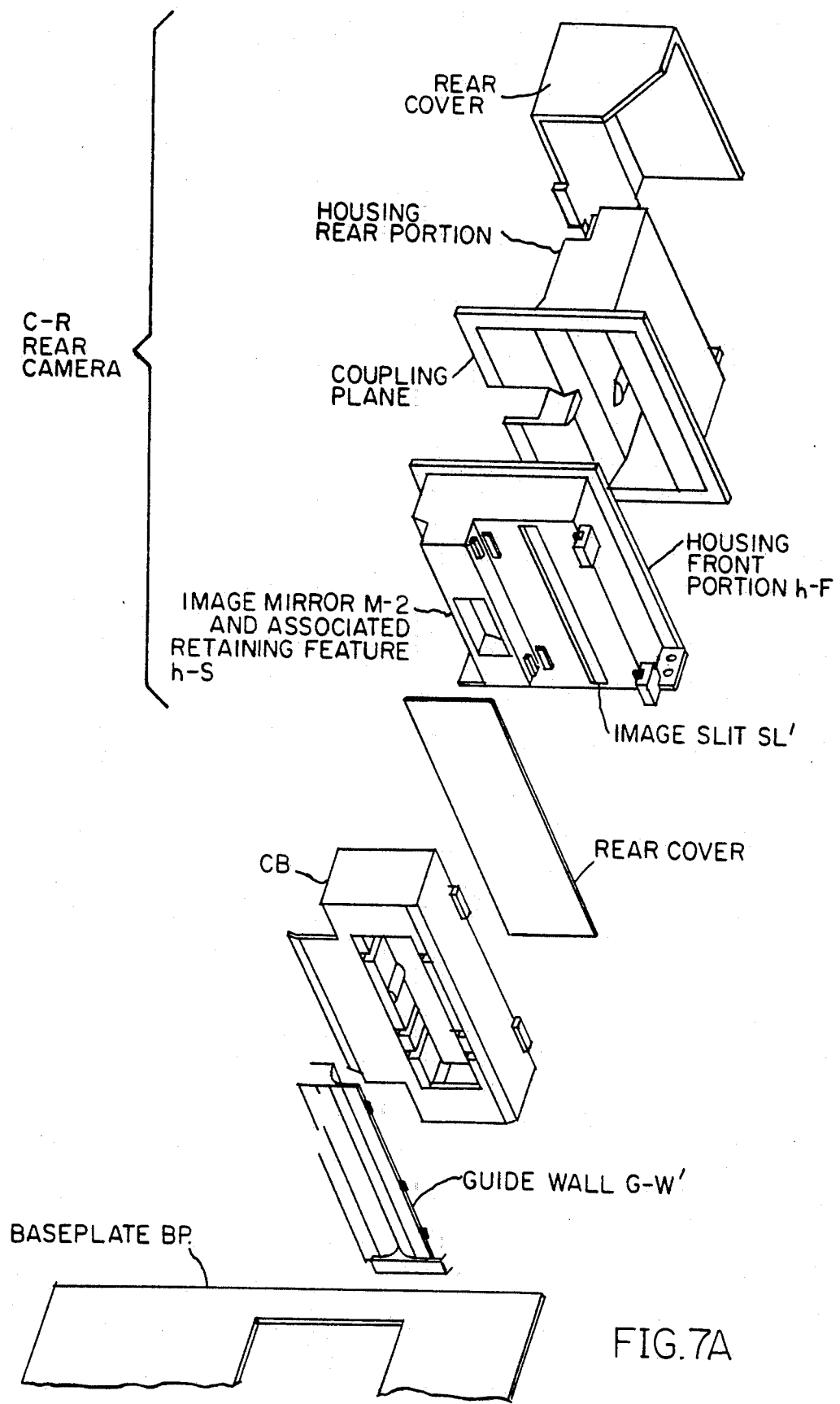
FIGS. 7A, 7B show a modified version of the embodiment in FIGS. 1, 2, 3B.
Figure 7B:
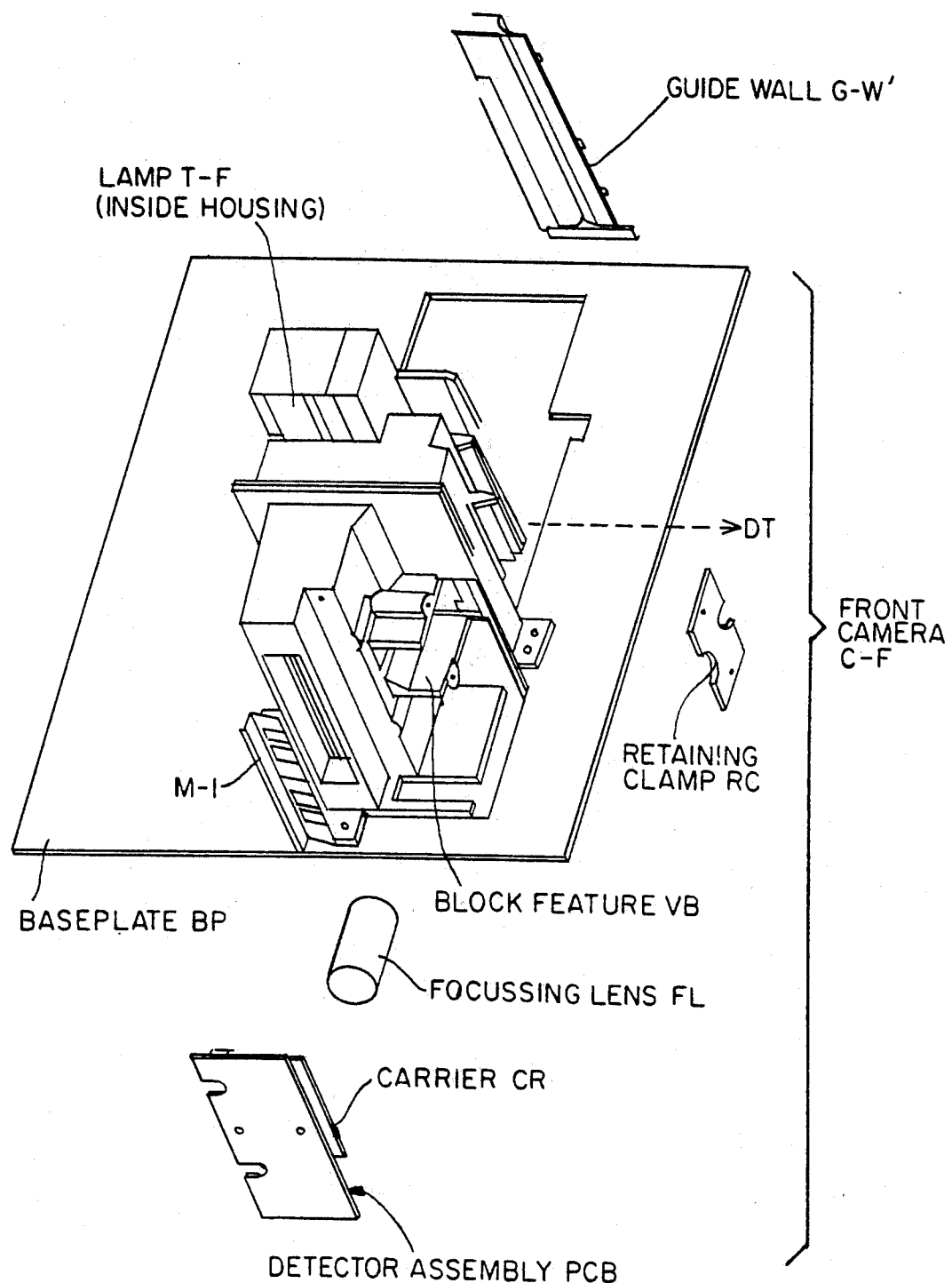

Workers will contemplate other, alternative ways of making and arranging such tubes and other means. For instance, FIGS. 7A, 7B show, in somewhat-exploded form, a camera like that aforedescribed, with a few modifications (assume construction essentially the same, except as otherwise noted below). Essentially, all elements are the same except for being reversed, left-to-right, and except that guide-window g-w in slit SL (e.g. see FIG. 3B) has been modified to a convergently-curved form G-W as shown in FIG. 3D. Rear-camera C-R is rather fully exploded part, while Front-camera C-F has only it's detector/carrier/PCB assembly and lens exploded-away, along with clamp FLC (securing lens FL in it's V-Block VB, once it has been position-adjusted there).

In conclusion, it will be understood that the preferred embodiments described herein are only exemplary, and that the invention is capable of many modifications and variations in construction, arrangement and use without departing from the spirit of the claims.

For example, the means and methods disclosed herein are also applicable to other related document-illuminating/document-imaging systems. Also, the present invention is applicable for enhancing other forms of imaging and related optical arrangements.

The above examples of possible variations of the present invention are merely illustrative. Accordingly, the present invention is to be considered as including all possible modifications and variations coming within the scope of the invention as defined by the appended claims.

What is claimed is:

1. A document-imaging camera adapted to illuminate a prescribed image-site past which documents are urged, and to direct document images along a prescribed image-path to image-sensor means, wherein said image-site is illuminated by one or more pairs of essentially-identical segments of a single U-shaped lamp, the segments being disposed symmetrically about the site so as to illuminate it; and wherein said images are sent back between said lamp segments along said image path.

2. The invention of claim 1 wherein two pairs of lamp segments are used, each pair to illuminate a respective front and rear side of the passing documents, for developing an image of each side.

3. The invention of claim 1 wherein each said lamp comprises a length of fluorescent tube bent to create said illuminating segments.

4. The invention of claim 3 where two pairs of lamp segments are used, each pair to illuminate a respective front and rear side of the passing documents, for developing an image of each document side.

5. The invention of claim 4 where the camera comprises relatively identical front and rear sections to capture respective images of said front and rear sides of said passing documents.

6. The invention of claim 1 wherein said image sensor means is mounted on reversible, two-sided/holder means which is arranged and adapted to present either a first side or a second, different, side normal to the optical path and to be reversible interchanging said sides and to thereby accommodate one of two different preset optical path lengths according to which side of the holder means the sensor means is mounted on.

7. An arrangement for a document-processing system wherein documents are serially, continuously transported past one or more imaging stations, each station having a prescribed illumination means which projects one or more pairs of illumination-beams to the respective said station to develop a document image at a respective imaging-site thereat, so that the so-illuminated document-image is projected along a respective imaging-path to the captured by associated sensor means, each said illumination means comprising: a pair of like elongate illuminating of a single U-shaped lamp structure, bent to present said segments, disposed symmetrically about said imaging path.

8. In a document processing system wherein documents are to be serially, continuously transported past one or more imaging stations, each station having a prescribed imaging-site which is illuminated by a respective source means projecting illumination-beams at its said site; the combination therewith of a pair of like elongate illuminating lamp segments symmetrically flanking said respective site, and arranged and adapted to each project a like illuminating beam at said site from a respective side thereof; said lamp segments being part of a single common lamp means bent to create said segments.

9. The invention of claim 8 where each lamp is a fluorescent tube-segment operated in RMS, constant-current mode.

10. The invention of claim 8 where the system is relatively simple and inexpensive, being adapted to handle checks and like documents continuously transported past said sites at about 100-200 in/sec. or less.

11. The invention of claim 8 where there are two such sites, a check-Front-imaging site and a check-Rear-imaging site, each arranged to be lit with such a fluorescent lamp within a respective Front and Rear camera housing; to illuminate respective front and rear sides of the passing checks.

12. The invention of claim 11 where each housing includes imaging-slit means sealed with a transparent window adapted to guidingly contact each passing document.

13. The invention of claim 12 where each housing is mounted on a common base means.

14. The invention of claim 13 where each housing includes illumination and imaging optics including adjustable-focus lens means and associated image-sensing camera means.

15. The invention of claim 14 where said image-sensing camera means is mounted in clamp means including reversing-positioned holder means having simple, planar mount-face on one side and protruding rim means on the opposite side thereof for selectably mounting said camera means to automatically reposition the camera means by a fixed distance closer or farther from said lens means.

16. A document-imaging system adapted to illuminate at least one prescribed image-site past which documents are urged, and to direct document images along a prescribed image-path to image-sensor means, wherein each said image-site is illuminated by one or more pairs of flanking essentially-identical segments of a single U-shaped lamp, bent to form the segments, the segments being disposed symmetrically about the site; and wherein said images are sent back between said lamp segments along said image path.

17. The invention of claim 16 wherein each said lamp comprises a length of fluorescent tube.

18. An arrangement for a document-processing system wherein documents are continuously transported past one or more imaging stations, each station having a prescribed illumination means which projects one or more pairs like illumination-beams to the respective said station to develop a document image at a respective imaging-site thereat, so that the so-illuminated document-image is projected along a respective imaging-path to be captured by associated sensor means, each said illumination means comprising: one or more pairs of like elongate lamp-segments of a single U-shaped lamp, each pair of segments developing a said pair of illumination beams.

19. A method of illumination in a document-imaging system adapted to illuminate a prescribed image-site past which documents are urged, and to direct document images along a prescribed image-path to image-sensor means, this method comprising providing elongate lamp means to illuminate each said site; bending said lamp means to form at least one pair of like illuminating lamp-segments, and disposing each pair of lamp segments symmetrically about the site to illuminate it.

20. The method of claim 19 including the steps of selecting and arranging said lamp means to comprise a length of fluorescent tube, and bending said tube to form said pairs of segments.

21. In a document-processing system wherein documents are serially, continuously transported past one or more imaging stations, each station having a prescribed illumination means which projectors one or more illumination-beams to the respective said station to develop a document image at a respective imaging-site thereat, so that the so-illuminated document-image is projected along a respective imaging-path to be captured by associated sensor means, the method of: providing elongate lamp means for each said illumination means, bending said lamp means to form at least one pair of like lamp-segments, and disposing the resulting segment pairs symmetrically about said imaging path to form said illumination beams.

* * * * *